(12) United States Patent
Zepf

(10) Patent No.: US 7,731,022 B2
(45) Date of Patent: Jun. 8, 2010

(54) APPARATUS SUPPORT STRUCTURE

(75) Inventor: Georg Zepf, Hagelstadt (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 10/588,327

(22) PCT Filed: Feb. 4, 2006

(86) PCT No.: PCT/EP2006/000974

§ 371 (c)(1),
(2), (4) Date: Dec. 12, 2006

(87) PCT Pub. No.: WO2006/087109

PCT Pub. Date: Aug. 24, 2006

(65) Prior Publication Data

US 2008/0258034 A1    Oct. 23, 2008

(30) Foreign Application Priority Data

Feb. 16, 2005  (DE) .................. 20 2005 002 469 U

(51) Int. Cl.
*B65G 21/00* (2006.01)
*B65G 41/00* (2006.01)
*B65G 47/00* (2006.01)
*B65G 37/00* (2006.01)

(52) U.S. Cl. .............. 198/860.1; 198/861.1; 198/478.1; 198/469.1; 198/480.1; 198/481.1

(58) Field of Classification Search ............. 198/860.1, 198/861.1, 478.1, 469.1, 480.1, 481.1, 441
See application file for complete search history.

(56) References Cited

U.S. PATENT DOCUMENTS

| | | | | |
|---|---|---|---|---|
| 6,058,985 | A | * | 5/2000 | Petri et al. .................. 141/168 |
| 2003/0075547 | A1 | * | 4/2003 | Stocchi .................. 220/592.01 |
| 2005/0247020 | A1 | | 11/2005 | Niesar et al. |
| 2006/0207859 | A1 | * | 9/2006 | Fiegler .................... 198/478.1 |

FOREIGN PATENT DOCUMENTS

| | | |
|---|---|---|
| EP | 1 074 471 A1 | 2/2001 |
| EP | 1 316 520 A1 | 6/2003 |
| WO | WO-03082679 A1 | 10/2003 |

* cited by examiner

*Primary Examiner*—Gene Crawford
*Assistant Examiner*—Yolanda Cumbess
(74) *Attorney, Agent, or Firm*—Marshall, Gerstein & Borun LLP

(57) ABSTRACT

The invention relates to a pre-table system (V) for container handling machines, comprising at least in-feed and out-feed starwheels (A, Z), arranged such as to be driven on support housings (1), defining a starwheel configuration (K) in the pre-table system (V), within which the support housing (1) is fixed to a floor-standing support structure (S) whereby the support structure (S) has a tube and/or profile section frame (6) of sections (7) directly or indirectly detachably connected to each other at points (N) by means of the support housing and floor support feet (8), within which the support housings are arranged in a free-standing manner such that free areas (15) are formed around the support housings and at least some sections (7) may be combined together and with support housings such that the starwheel configurations (K) may be optionally altered.

9 Claims, 1 Drawing Sheet

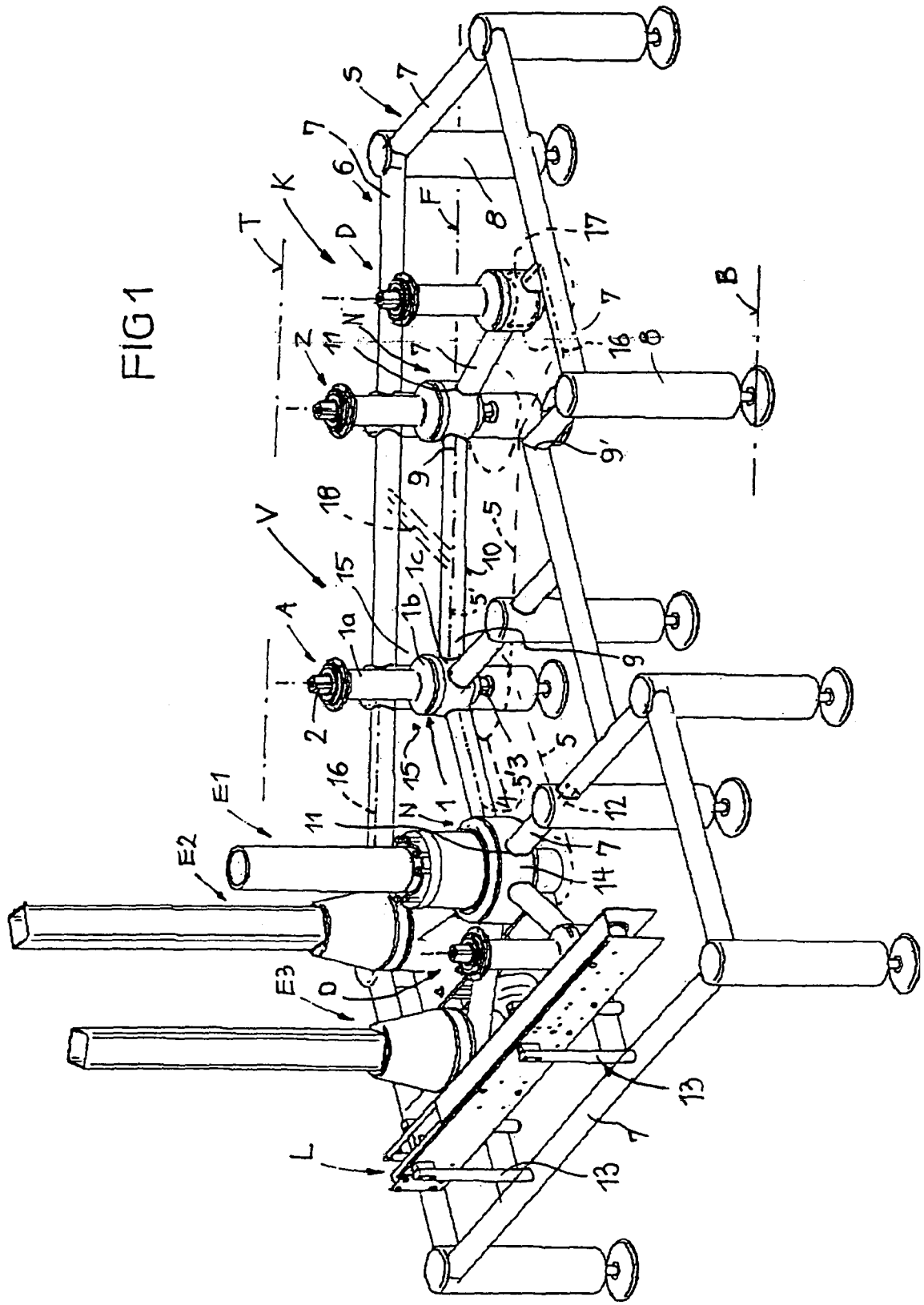

APPARATUS SUPPORT STRUCTURE

CROSS-REFERENCE TO RELATED APPLICATION

This is the U.S. national stage under 35 U.S.C. §371, of international application no. PCT/EP2006/000974, having an international filing date of Feb. 4, 2006, and claims priority to German application no. 20 2005 002 469.4 filed on Feb. 16, 2005.

FIELD OF THE DISCLOSURE

The disclosure relates to an apparatus support structure according to the preamble of claim 1.

BACKGROUND OF THE DISCLOSURE

The usual standard for apparatus support structures for container handling machines, such as bottle filling machines, is a plate body, in which at least the entry and exit stars, optionally also transfer stars, and optionally other container handling components are mounted in predetermined positions. Such conventional apparatus support plate bodies are difficult to clean and unsatisfactory from a microbiological point of view. Moreover, the given star configuration is rigidly established and not variable.

From EP 1 316 520 A, an apparatus support structure is known which is a construction variant based on a duct carrier, which is in the shape of a section of an arc of a circle and stands on the floor with feet; it forms not only the support structure for the stars, it also presents rigidly integrated position locations for additional container handling components. Seat-shaped support housings are welded to established positions in the duct carrier for the stars. At the ends of the duct carrier, additional attachment possibilities are provided. The duct carrier is open downwards at least in some areas and it is therefore more advantageous than the known apparatus support structure with a plate carrier in terms of cleaning and microbiological conditions. The duct carrier fits different container handling machines.

The number and type of the stars and container handling components can differ from case to case.

SUMMARY OF THE DISCLOSURE

The disclosure is based on the problem of indicating an apparatus support structure which is even more advantageous in terms of cleaning and microbiological conditions, and which allows a high degree of freedom with regard to the possibility of modifying the star configuration.

In contrast to the known principle of the large-surface plate body and the duct carrier support structure in the form of an arc of a circle, a pipe or profile frame with feet, which is composed of sections, is used as support structure. The sections serve not only for the formation of the frame, but also for positioning, and they carry at nodes support housings for stars, such as, for example, entry and exit stars, or similar parts. The apparatus support structure is advantageous with regard to cleaning, for example, because only small surfaces that slant downward are provided on the sections, on which fluids can immediately run off, and also because large free spaces are created around the support housing. The support housing and the sections can be combined as desired, and they make it possible to adapt or modify the apparatus support structure and the given star configuration in a modular construction to the individual application cases, for example, by the addition or removal of star and/or container handling components. The sections of the pipe or profile frame and the support housing form a kind of modular set, from which different star configurations can be prepared. Because the free spaces are clear from the fixation level to the floor, it is possible to integrate in this area without any problem an open drive system, at least for the stars. Individual components, for example stars, can be exchanged at any time without having to attach the entire composite structure.

The modular construction of the support structure makes it possible to incorporate at least one additional container handling component for a closing device, an inspection device, or a similar device in the fixation plane in the star configuration, because the pipe or profile frame with its feet forms a very stable, yet elegant, frame structure.

An additional variation exists because it is also possible to fix to sections of the pipe or profile frame and/or at nodes at least one additional container handling component, such as a conveyor, splash removing device or similar device. In the fixation plane, the profile or pipe frame offers sufficient possibilities for this purpose, without having to abandon the fundamental principle of the open construction, which is important for cleaning and for microbiological conditions.

In an embodiment variant, it is advantageous if the stars and optionally integrated container handling units are positioned inside the frame and surrounded outside at a distance by sections forming a type of stiffening and screening frame.

Here it can be advantageous if, in a top view and in the viewing direction towards the floor, the thickness of the sections are designed to be smaller than the diameter of the support housing and of the feet, to produce large free space areas while maintaining a sufficiently stable support structure, and to provide surfaces which are as small as possible and from which the fluids can run off rapidly.

In view of optimal cleaning results and perfect hygienic or microbiological conditions, it is advantageous to construct at least the sections of the pipe frame from stainless steel or optionally as solid profiled parts with stainless steel surfaces.

In an alternative embodiment, the sections of the profiled frame are profiled parts that are open at the bottom, and whose surfaces pointing away from the floor are curved or are flat and slope towards the floor, so that fluids can run off quickly and cannot stagnate. The construction of the profiled sections, with downward opening, offers the advantage of allowing the protected installation of supply and control strands, hoses, cables and similar parts, while always allowing access to them. Furthermore, the construction with downward opening has the advantage of being easier to install with connection elements, which are easily accessible and nevertheless not subject to the influence of fluids and contaminants.

Each section advantageously presents at least one joining end, which fits with a connection interface of a support housing or of a foot. As a result, the installation is simplified, and smooth joining places can be formed.

At least some individual sections, which are not connected to the support housing or other container handling components, should present at least one butt-joint or mitered connection end. With these sections it is possible to produce frame sections that deviate from a straight course, which may be advantageous, for example, in places where peripheral construction groups have to be associated with the apparatus support structure.

In principle, it is advantageous for the joining places in the pipe or profile frame to have externally a smooth design and to contain internal connection elements. This offers advantages in view of the hygienic or microbiological conditions.

In a preferred embodiment, at least some stars contain in their support housing accommodated individual drives, for example electrical servo motors with driving system or electrical direct drive motors. Control or supply strands leading to these individual drive systems can be installed in sections of the pipe or profile frame.

In an alternative embodiment, beneath the fixation plane on the bottom sides of the support housing, drive wheels, such as sprocket wheels, toothed wheels or belt toothed wheels, are arranged free-standing and connected by uncovered drive connections (meshing toothed wheels, chains, toothed belts or articulation shafts) to a central drive system. This open drive system can be designed so it is safe from the hygienic point of view and can be cleaned without problems.

In an alternative embodiment, drives accommodated in the support housing can be driven by means of drive strands, such as, for example, articulation shafts or belts, which are arranged in sections.

In an advantageous embodiment, each support housing has a narrow upper part which preferably tapers upward, and a broadened foot part. The foot part stands without transition on an advantageously round housing, which forms the node of the profile or pipe frame, on which housing at least two connection interfaces are provided, which are offset about the housing axis. These interfaces are, for example, connection flanges or rapid coupling means.

If it is advantageous, covers can be provided, at least in some areas, in or on the pipe or profile frame, or optionally beneath the fixation level. These covers can be grid-like structures, plate metal parts, or parts made of plastic or glass.

BRIEF DESCRIPTION OF THE DRAWINGS

Embodiments of the object of the disclosure are explained with reference to the drawing.

In the drawing, FIG. 1 contains a schematic perspective view of an apparatus support structure, in which several detailed variants are indicated next to each other.

DETAILED DESCRIPTION OF THE DISCLOSURE

Schematically represented apparatus support structure V in FIG. 1 is associated operatively with a container handling machine—not shown—, for example a bottle filling machine, in such a manner that transport routes of the apparatus support structure V, which run in a transport plane T, are connected to the transport routes in the container handling machine. The transport of the containers into and out of the container handling machine is carried out primarily by means of the apparatus support structure V, where, however, additional container handling components can be incorporated in the apparatus support structure, optionally at the entry side or the exit side. In the embodiment shown in FIG. 1, an entry and exit apparatus support structure V is completed, for example, by the closing devices E1, E2, E3 and an additional conveyor L, as well as at least one transfer star D.

A support structure S of the apparatus support structure V is formed by a pipe or profile frame 6, which is constructed from individual sections 7 and feet 8 which stand on the floor (floor plane B), and which positions the individual container handling components relative to each other and supports them. The sections 7, in the pipe or profile frame, form a fixation plane F, which is located with some separation beneath the transport plane T and above the floor plane B, and which is substantially horizontal. To simplify and to show the construction of the apparatus support structure more clearly, only the basic components of the container processing components are indicated. The container transporting elements, guidance tracks, monitoring elements and similar parts are omitted in the drawing.

An entry star Z, which transports, for example, the containers into the container handling machine, is fixed in the transport direction downstream of a transfer star D and adjacent to an exit star A in the pipe or profile frame 6. In the transport direction of the exit star A, the next element in the pipe or profile frame 6 is a first closing device E1, next to which a second closing device E2 is placed, as well as an additional closing device E3 and an additional transfer star D, which is followed by a straight conveyor L.

Each star, for example, the exit star A, is provided with an upper uncovered drive shaft 2 on a standing support housing 1, which can be composed of a narrow upper part 1a, which may optionally taper upward in a torpedo-like shape, a broader foot part 1b and a lower housing 1c. At the lower side of the lower housing 1c, a drive shaft 3 can optionally project in the direction towards the floor, where the shaft can carry a drive wheel 4 (toothed wheel, sprocket wheel, toothed belt wheel or similar part). The drive wheels 4 are interconnected by drive connections and they are coupled with a central drive system (not shown) in such a manner that movement is transmitted. The drive connections can be toothed wheels, chains, toothed belts, articulation shafts or similar parts.

Alternatively (in the case of the transfer star D shown in the far right of FIG. 1), the stars A, Z, D can contain in their support housings individual drives 17 (electrical servo motors with drive systems or electrical direct drive motors) which are operated advantageously via control and supply strands 16 installed in sections 7.

As an additional alternative, it would be conceivable to set in motion drive parts which are located inside the support housings via drive strands 5' installed in individual sections 7, for example, via articulation shafts and deflection drive systems (conical or worm wheel drive systems) or similar devices.

The sections 7 of the pipe or profile frame are made from stainless steel pipes having advantageously the same diameter, and/or sections of the pipe or profile frames may be from solid profiled parts with a stainless steel surface. The feet 18 are stainless steel columns, whose upper ends are closed off with fluid seal, and which present height-adjustable foot parts. Alternatively, the sections 7 can also be profiled parts made of stainless steel and with a bottom-side opening (U-shaped profiles or similar shapes), where, however, the arrangement is such that the profiled parts present no flat horizontal surfaces, rather they form curved surfaces, or surfaces which are flat and slanted towards the floor, on which fluids can run off rapidly.

The sections 7 arranged in the pipe or profile frame 6, at least in the positions of the support housing 1, form the nodes N, and they are fixed in a detachable manner with joining ends 9 to connection interfaces 11 of the support housing 1. The joining places are advantageously flat and they contain, for example, internal connection elements 12. The connection interfaces 11 are, for example, bolt flanges with bolt tie rods.

The sections 7 which run along the external circumference of the pipe or profile frame 6, on the other hand, can present butt-joint or mitered connection ends 9'. On at least some sections 7, attachment points which can be uncovered can be provided for the supports 13, for example for the installation of the conveyor L.

Each closing device E1, E2, E3 integrated in the apparatus support structure V presents a support housing 14 which has a diameter which is larger than that of the support housing 1, and which is fixed by means of a connected section 7 to a node N in the pipe-profile frame 6.

The sections 7 are installed in the pipe or profile frame in such a manner that, at least around the support housings 1, 14, large free space areas 15 extend continuous to the floor. Supply and/or control strands 16, or also lines for cleaning fluid for the sloshing, can be installed in sections 7 leading also to the closing devices E1, E2, E3 and the conveyor L. If necessary, in the pipe or profile frame, or above or beneath the former, at least in some areas, covers 18 can be mounted, such as grids, metal plate parts, or plastic or glass parts.

Because the sections, the feet 8, and the support housings 1, 14 fit with each other in a modular manner, it is possible to form star configurations that deviate from the depicted star configuration K, or the star configurations shown in FIG. 1 can be modified as desired by the addition or removal of individual container handling components. For repair or replacement, individual components can be dismantled, and removed or replaced, without having to separate the composite. This modular building block construction allows a high variability with a great variety of configurations, which advantageously also allow a subsequent modification of an already existing installation at low cost and without problems.

The invention claimed is:

1. Apparatus support structure for container handling machines, comprising:
   entry and exit stars, each entry and exit star being arranged on a support housing and drivable via at least one drive from the inside of the support housing,
   a star configuration of the apparatus support structure being defined by the relative positioning of the entry and exit stars,
   the support housings being within the star configuration and fixed above a floor plane and beneath a transport plane in the apparatus support structure which stands on the floor on floor feet,
   wherein
   the apparatus support structure being one of a pipe or profile frame with sections and substantially horizontal and defining a fixation plane at least for entry and exit stars,
   the sections of the pipe frame being one of stainless steel pipes or round solid profiled parts,
   the sections of the profile frame being profiled parts whose bottoms are open, and whose surfaces pointing away from the floor plane are one of curved or flat and slanted towards the floor plane,
   each section presenting at least one joining end which fits with a joining end or a connection interface of one of another section or of a support housing or of a floor foot for detachably connecting sections either to each other or to a support housing or to a floor foot,
   the sections being connected to each other at nodes by one of directly or via a support housing or a floor foot located at a node,
   wherein on the floor feet the support housings stand freely with the sections arranged in such a manner that open areas are formed between sections around the support housings, and
   at least some sections can be combined with each other and with support housings and with floor feet whereby the star configuration is changeable as desired by opening the detachable connections between sections and/or a respective section and a respective support and/or a respective section and a respective floor foot.

2. Apparatus support structure according to claim 1, wherein in addition to entry and exit stars, at least one additional container handling component comprising one of a closing device, an inspection device, or a labeling machine, is fixed at a node of the pipe or profile frame.

3. Apparatus support structure according to claim 1, wherein in addition to the entry and exit stars, at least one additional container handling component comprising one of a conveyor or a splash removing device is fixed on a section and/or in the vicinity of a node of the pipe or profile frame.

4. Apparatus support structure according to claim 1, wherein entry and exit stars and an additional container handling component are arranged inside of the external circumference of the apparatus support structure as defined by sections of the pipe or the profile frame which sections are located at outer sides of the apparatus support structure.

5. Apparatus support structure according to claim 1, wherein individual sections in the pipe or the profile frame present blunt impact or mitered impact joining ends.

6. Apparatus support structure according to claim 1, wherein at least some stars have individual drives accommodated in their support housings, the respective drive being one of an electrical servo motor or an electrical direct drive motors, and wherein control and supply strands leading to the individual drive are arranged in sections of the pipe or the profile frame.

7. Apparatus support structure according to claim 1, wherein beneath the fixation plane of the pipe or the profile frame, on the bottom sides of the support housings, one of sprocket wheels, toothed wheels or belt toothed wheels are arranged and are connected via drive devices with a central drive system.

8. Apparatus support structure according to claim 1, wherein a respective drive accommodated in one of the support housings is connected o drive strands placed in sections of the pipe or the profile frame.

9. Apparatus support structure according to claim 1, wherein each support housing has a narrow upper part, tapering upwardly, and a broadened foot part, and is mounted with a foot part on a bottom support housing, located at the node of the pipe or profile frame, the bottom support housing having at least two section connecting interfaces, which are offset about an axis of the bottom support housing.

* * * * *